United States Patent [19]
Ross

[11] Patent Number: 5,801,783
[45] Date of Patent: Sep. 1, 1998

[54] REMOTE ACCURATE FREQUENCY GENERATION USING A NUMERICALLY CONTROLLED OSCILLATOR

[75] Inventor: Michael R. Ross, Westminster, Colo.

[73] Assignee: Lucent Technologies Inc., Murray Hill, N.J.

[21] Appl. No.: 740,593

[22] Filed: Oct. 31, 1996

[51] Int. Cl.$^6$ ...................................................... H04L 7/08
[52] U.S. Cl. .......................... 455/502; 370/324; 370/350; 370/503; 455/503; 455/71; 455/119; 455/260; 455/265
[58] Field of Search ..................................... 455/507, 502, 455/503, 13.2, 524, 71, 75, 76, 119, 192.1, 255, 259, 260, 265, 108, 109; 331/1 A, 10; 370/324, 350, 335, 503, 508, 337, 524, 349, 426, 512; 375/206, 355, 356

[56] References Cited

U.S. PATENT DOCUMENTS

| | | | |
|---|---|---|---|
| 4,516,269 | 5/1985 | Krinock | 455/503 |
| 4,517,669 | 5/1985 | Freeburg et al. | 455/502 |
| 4,589,066 | 5/1986 | Lam et al. | 395/553 |
| 4,617,674 | 10/1986 | Mangulis et al. | 375/206 |
| 4,633,193 | 12/1986 | Scordo | 331/1 A |
| 4,649,543 | 3/1987 | Levine | 371/41 |
| 4,665,404 | 5/1987 | Christy et al. | 342/463 |
| 4,672,658 | 6/1987 | Kavehrad et al. | 455/555 |
| 4,688,210 | 8/1987 | Eizenhofer et al. | 370/335 |
| 4,696,052 | 9/1987 | Breeden | 455/503 |
| 4,718,109 | 1/1988 | Breeden et al. | 455/503 |
| 4,754,453 | 6/1988 | Eizenhofer | 370/337 |

(List continued on next page.)

FOREIGN PATENT DOCUMENTS

| | | |
|---|---|---|
| 9100660 | 1/1991 | WIPO. |
| 9304545 | 3/1993 | WIPO. |
| 9312599 | 6/1993 | WIPO. |
| 9321739 | 10/1993 | WIPO. |

OTHER PUBLICATIONS

Stallings, W., *ISDN An Introduction*, Macmillan Publishing Company, New York, 1989, pp. 281–287.

Baxter, et al., *Communications and Control Architecture*, AT&T Technical Journal, vol. 64, No. 1, Jan. 1985, pp. 153–173.

*Wireless PBX*, Western Communications Forum, Anaheim, CA, Feb. 2–5, 1992, Ericsson Business Communications Inc.

*Primary Examiner*—Howard Britton
*Attorney, Agent, or Firm*—John C. Moran

[57] ABSTRACT

Within a communication system, driving a numerically controlled oscillator with a frequency of a precision frequency oscillator and adjusting the frequency of the numerically controlled oscillator by a calculated number to be equal to that of a frequency signal derived from an external source. The calculated number utilized to adjust the numerically controlled oscillator is then transmitted to each of a number of subunits. Each subunit has another numerically controlled oscillator that is driven by a frequency derived from an internal communication link connecting the subunit to the communication system; and the other numerically controlled oscillator is controlled by the calculated number so that its frequency matches the frequency of the precision oscillator. The frequency of the internal communication link is controlled by the precision oscillator. In a second embodiment, a frequency signal derived from an external source is used to drive a numerically controlled oscillator whose frequency is adjusted by a calculated number to be equal to that of a precision frequency oscillator. The calculated number utilized to adjust the numerically controlled oscillator is then transmitted to each of a number of subunits. Each subunit has another numerically controlled oscillator that is driven by a frequency derived from an internal communication link connecting the subunit to the communication system; and the other numerically controlled oscillator is controlled by the calculated number so that its frequency matches the frequency of the precision oscillator. The internal communication link is frequency locked to the external source.

21 Claims, 4 Drawing Sheets

U.S. PATENT DOCUMENTS

| | | | |
|---|---|---|---|
| 4,933,890 | 6/1990 | Nuytkens | 364/721 |
| 4,985,891 | 1/1991 | Fujiwara et al. | 370/524 |
| 5,023,572 | 6/1991 | Caldwell et al. | 331/10 |
| 5,117,424 | 5/1992 | Cohen et al. | 370/508 |
| 5,123,112 | 6/1992 | Choate | 455/524 |
| 5,177,766 | 1/1993 | Holland et al. | 375/206 |
| 5,184,347 | 2/1993 | Farwell et al. | 370/350 |
| 5,187,806 | 2/1993 | Johnson et al. | 455/15 |
| 5,189,670 | 2/1993 | Inglis | 370/349 |
| 5,228,038 | 7/1993 | Jestice et al. | 370/426 |
| 5,388,102 | 2/1995 | Griffith et al. | 455/502 |
| 5,511,090 | 4/1996 | Denton | 375/206 |

REMOTE ACCURATE FREQUENCY GENERATION USING A NUMERICALLY CONTROLLED OSCILLATOR

TECHNICAL FIELD

This invention relates generally to telecommunication systems, and in particular, to wireless telecommunication systems.

BACKGROUND OF THE INVENTION

In personal communication service (PCS) systems, it is necessary to generate accurate frequencies within the wireless base stations in order to assure proper operation of the wireless telecommunication system of which the wireless base stations are part. In addition, it is necessary to low frequency phase synchronize the clocks of the wireless base stations. The clocks of the wireless base station must be synchronized at a precise low frequency such as 0.488 Hz. In PCS systems, this is normally done by allowing one of the base stations to be the master and periodically transmitting the synchronization information via a wireless channel. The problem with this method is that all base stations must be able to receive the transmitted synchronization signals. In larger PCS systems, it is not possible for one base station to serve as the master with respect to synchronization since no one base station can broadcast to all other base stations. A second method that has been utilized in PCS systems, is to have a separate wired distribution system that provides the synchronization signals to each of the base stations. The problem with this technique is the added cost and maintenance to the PCS system. A typical base station in a PCS system only handles a maximum of three wireless handsets at a time; hence, there are a large number of base stations to cover a large geographical area. This large number of base stations increases the cost of providing a separate wired distribution signal for synchronization signals or for accurate frequencies.

In cellular systems in which a base station handles hundreds of wireless handsets and where the synchronization must occur at approximately 8 KHz, one technique employed to perform the synchronization is to utilize a earth-orbiting satellite to broadcast a synchronization signal. Another technique in cellular systems is to have wire or optical fiber links separate from normal, customer traffic, communication links to connect the base stations to a central controller. The central controller transmits the synchronization signals to the base stations over these links. In yet another technique, the central controller periodically stops the normal communication on the normal communication links leading between the base station and the central controller, then broadcast synchronization signals on the links, and then resumes normal communication. While avoiding the expense of separate dedicated synchronization links, this technique causes periodic interruptions in normal communication. Another technique for cellular base stations is disclosed in U.S. Pat. No. 5,388,102. The method disclosed in this patent requires that the ISDN interface cards utilized in the telecommunication switching system interconnected to the base stations be modified so that the synchronization signals can be transmitted in the physical layer protocol of the ISDN interface. In addition, that method also requires that the internal bus structure of the telecommunication system be modified to provide necessary timing to the modified ISDN interface cards. The problem with this method is that it does not adapt well to use with a variety of telecommunication switching systems.

Another problem in PCS systems is that a PCS system is interconnected either directly to the public telephone switching network or a business communication system via ISDN telecommunication links. The PCS system must maintain frequency lock with the network clock of the public telephone network or business communication system for proper transmission. The PCS system does this by frequency locking onto the transmission frequency of an ISDN telecommunication link between the PCS system to the external system. Transmission data is lost when a slip occurs due to a difference in frequency in the PCS system and the external system. When a slip occurs, data is lost because too much data is received, the network clock is faster than the PCS system's clock; or when not enough data is received, the network clock is slower than the PCS system's clock. To avoid slips within the PCS system, wireless base stations of the PCS system must be frequency locked with the internal network interfaces of the PCS system that in turn must be frequency locked to the external system. The result is that it is not possible in a PCS system to use a centralized, highly, accurate clock and to distribute this clock to the wireless base stations via the internal telecommunication links.

What the prior art lacks is a simple and inexpensive technique for supplying accurate frequency information from a centralized unit of a PCS system to the wireless base stations.

SUMMARY OF THE INVENTION

This invention is directed to solving these and other shortcomings and disadvantages of the prior art. In accordance with the invention, within a communication system, a frequency of a precision frequency oscillator is used to drive a numerically controlled oscillator whose frequency is adjusted by a calculated number to be equal to that of a frequency signal derived from an external source. The calculated number utilized to adjust the numerically controlled oscillator is then transmitted to each of a number of subunits. Each subunit has another numerically controlled oscillator that is driven by a frequency derived from an internal communication link connecting the subunit to the communication system; and the other numerically controlled oscillator is controlled by the calculated number so that its frequency matches the frequency of the precision oscillator. The frequency of the internal communication link is controlled by the precision oscillator. In a second embodiment, a frequency signal derived from an external source is used to drive a numerically controlled oscillator whose frequency is adjusted by a calculated number to be equal to that of a precision frequency oscillator. The calculated number utilized to adjust the numerically controlled oscillator is then transmitted to each of a number of subunits. Each subunit has another numerically controlled oscillator that is driven by a frequency derived from an internal communication link connecting the subunit to the communication system; and the other numerically controlled oscillator is controlled by the calculated number so that its frequency matches the frequency of the precision oscillator. The internal communication link is frequency locked to the external source.

Advantageously, the communication system is a PCS system, and the subunits are wireless base stations. The external source may advantageously be an external telecommunication link interconnecting the PCS system to a telecommunication switching system.

These and other advantages and features of the invention will become more apparent from the following description

DETAILED DESCRIPTION

Figure 1:
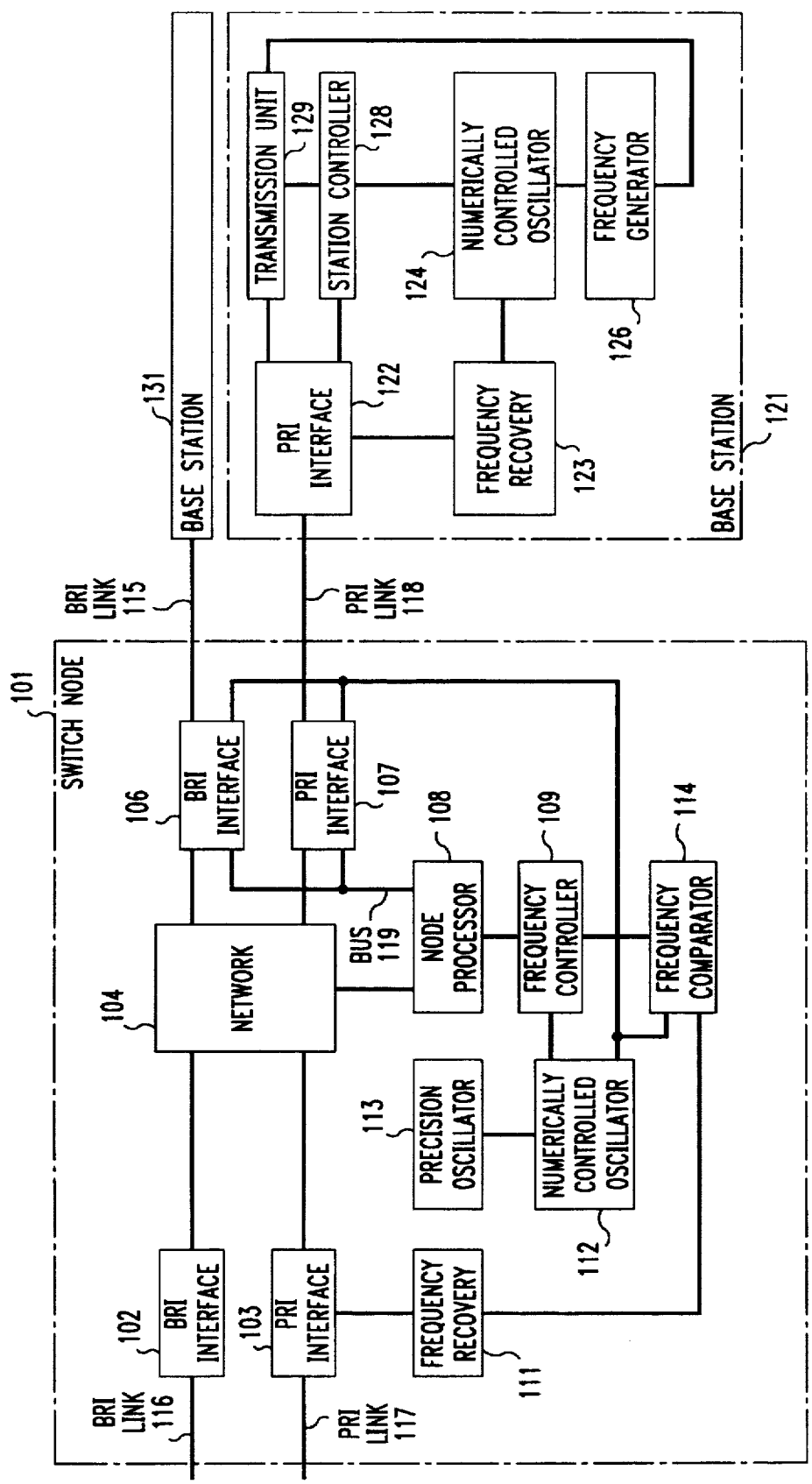
FIG. 1 illustrates, in block diagram form, a wireless telecommunication system that incorporates an illustrative embodiment of the invention.

FIG. 1 illustrates a block diagram of a wireless telecommunication system. Switch node 101 provides telecommunication switching service to wireless handsets that request such service via base stations 121 through 131. Node processor 108 via bus 119 and network 104 and appropriate BRI and PRI links provides control for the base stations. Network 104 provides switching between a public telephone network interconnected by BRI link 116 through PRI link 117 and base stations 121 through 131. The base stations are interconnected via BRI or PRI interfaces within switch node 101 and a corresponding interface within the base station. For example, base station 121 is interconnected to switch node 101 via PRI link 118 which is terminated by PRI interfaces 107 and 122. One skilled in the art could readily envision that switch node 101 could be any one of a variety of communication systems and that the base stations could be any of a variety of subunits on such a communication system.

The transmission frequency of PRI link 117 is recovered by PRI interface 103 using well-known techniques in the art and transmitted to frequency recovery circuit 111. Frequency recovery circuit 111 performs well known smoothing techniques on the recovered frequency signal and transfers this frequency signal to frequency comparator 114. Numerically controlled oscillator 112 is controlled by frequency controller 109 which inputs a 32 bit number, N, into oscillator 112 so as to control its frequency to be equal to that being generated by frequency recovery circuit 111. Numerically controlled oscillator 112 uses the frequency signal generated by precision oscillator 113 as its reference frequency. The two frequency signals produced by oscillators 112 and frequency recovery circuit 111 are compared by frequency comparator 114. Frequency controller 109 is responsive to the comparison performed by comparator 114 to adjust the frequency of numerically controlled oscillator 112. The output of oscillator 112 is used to control the transmission frequency of internal interfaces such as PRI interface 107. Numerically controlled oscillators of this type are well known in the art and examples of such oscillators are set forth in U.S. Pat. No. 4,933,890 which is hereby incorporated by reference. Frequency controller 109 performs the following calculation:

$$\text{freq. of Osc. 113} \times \frac{N}{32^2} = \text{freq. from circuit 111}.$$

When frequency controller 109 has adjusted the output of numerically controlled oscillator 112 to be equal to that of precision oscillator 113 within a predefined range, frequency controller 109 transmits the resulting number, N, to node processor 108. Node processor 108 utilizing a user-info message to transmit this number via interconnecting link interfaces to the base stations 121 through 131. One skilled in the art could also readily see that logical links could be individually set up on D channels of the telecommunication links interconnecting the base stations and node processor 108. Each of these logical channels then could be utilized to transmit the derived number to each base station. For example, node processor 108 transmits the number to an application running in station controller 128 via PRI interface 107, PRI link 118, and PRI interface 122. Station controller 128 then divides this number $2^{32}$ by N and transmits the result to numerically controlled oscillator 124 which is identical to numerically controlled oscillator 112. The frequency utilized to drive numerically controlled oscillator 124, is that recovered from PRI link 118 by PRI interface 122 and frequency recovery circuit 123. The resulting frequency generated by numerically controlled oscillator 124 and transmitted to frequency generator 126 is equal within a predefined limit to the frequency generated by precision oscillator 113. Frequency generator 126 then utilizes the frequency signal received from oscillator 124 to generate different frequencies required by transmission unit 129 to communicate with wireless handsets. Among these frequencies is the 0.488 Hz signal. Also, station controller 128 controls transmission unit 129 and utilizes transmission unit 129 to communicate with wireless handsets.

Figure 2:
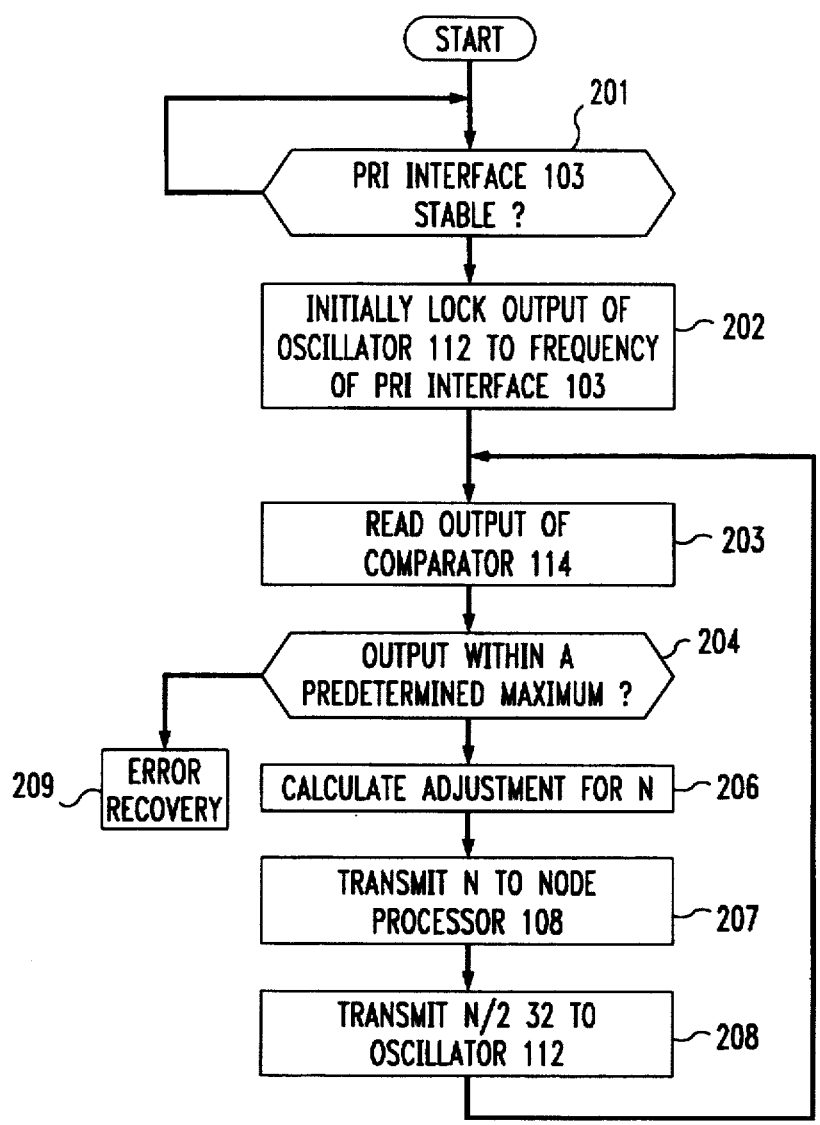
FIG. 2 illustrates, in flow chart form, the operations performed by a frequency controller within a switch node of the wireless telecommunication system.

FIG. 2 illustrates, in flow chart form, the steps performed by frequency controller 109. Decision block 201 determines if PRI interface 103 is stable. If PRI interface 103 is stable, node processor 108 transmits a message to that effect to frequency controller 109. Block 202 performs the initial frequency locking of oscillator 112 to the frequency being derived from PRI interface 103. After the initial frequency locking is performed which will occur on initialization, block 203 reads the output of comparator 114. Decision block 204 then determines if this output is within a predetermined maximum. If the transmission frequency of PRI interface 103 drifts out of the predetermined maximum limit, frequency controller 109 will not adjust numerically controlled oscillator 112 for this drift. Rather, switch node 101 and related base stations will simply use the frequency of oscillator 112. However, block 109 performs error recovery that eventually involves the reexecution of decision block 201. If the answer in decision block 204 is yes, block 206 calculates "N". Block 207 transmits the calculated "N" to node processor 108 which then retransmits this number to each of the station controllers of FIG. 1. After execution of block 207, block 208 transmits the number which is "N" divided by $2^{32}$ to numerically controlled oscillator 112. After execution of block 208, control is transferred back to block 203.

Figure 3:
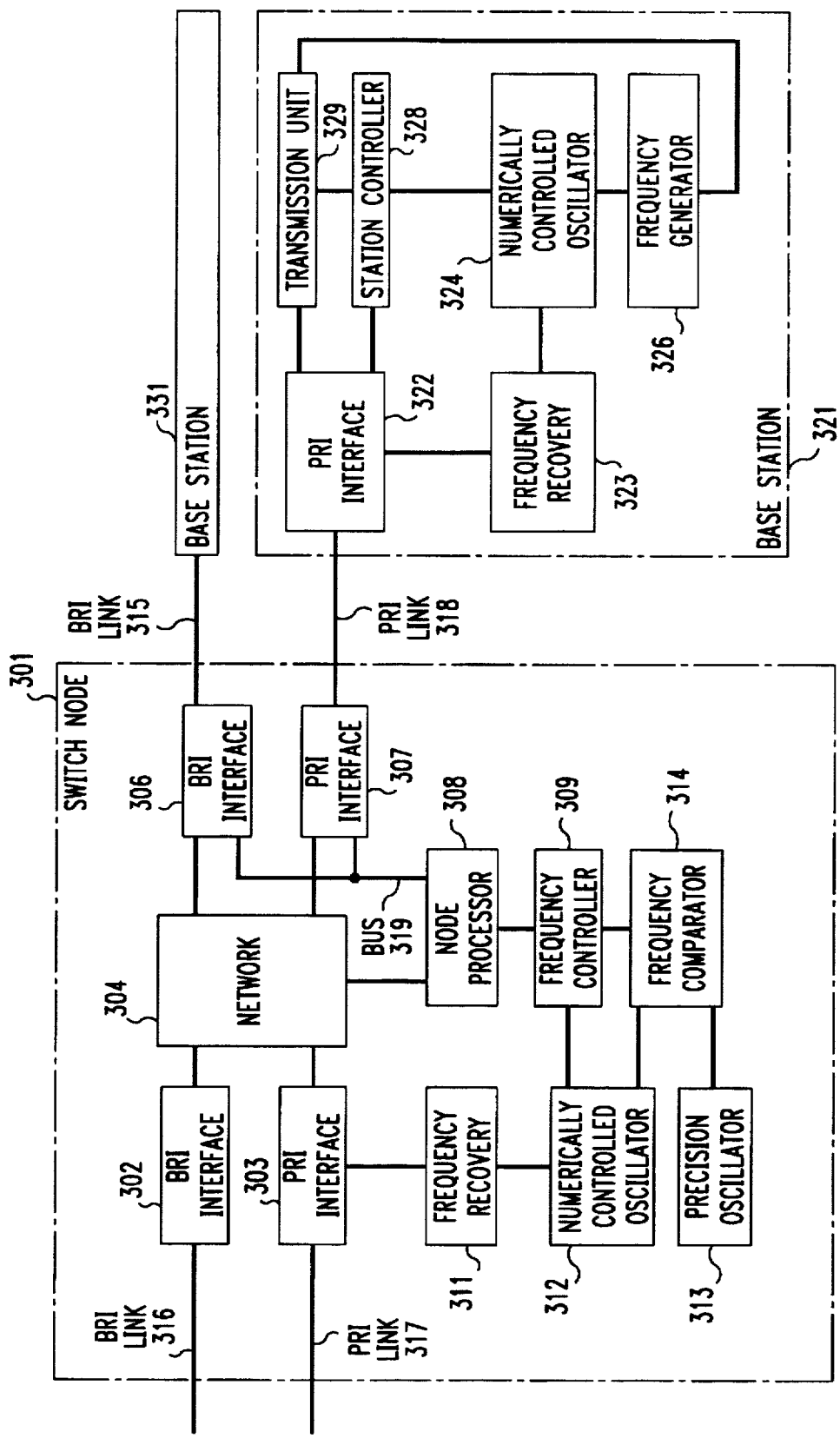
FIG. 3 illustrates, in block diagram form, another embodiment of the invention.

FIG. 3 illustrates, in block diagram form, a wireless telecommunication system of a second embodiment of the invention. In this embodiment, transmission frequency of the internal interfaces is frequency locked to transmission frequency of an external interface. Switch node 301 provides telecommunication switching service to wireless handsets that request such service via base stations 321 through 331. Node processor 308 via bus 319 and network 304 and appropriate BRI and PRI links provides control for the base stations. Network 304 provides switching between a public telephone network interconnected by BRI link 316 through PRI link 317 and base stations 321 through 331. The base stations are interconnected via BRI or PRI interfaces within switch node 301 and a corresponding interface within the base station. For example, base station 321 is interconnected to switch node 301 via PRI link 318 which is terminated by PRI interfaces 307 and 322. In the present embodiment, the BRI and PRI links interconnecting the base stations to switch node 301 are frequency locked to the transmission frequency of PRI link 317.

The transmission frequency of PRI link 317 is recovered by PRI interface 303 using well-known techniques in the art and transmitted to frequency recovery circuit 311. Frequency recovery circuit 311 performs well known smoothing techniques on the recovered frequency signal and transfers this frequency signal to numerically controlled oscillator 312. Oscillator 312 is controlled by frequency controller 309 which inputs a 32 bit number into oscillator 312 so as to control its frequency to be equal to that being generated by precision oscillator 313. The two frequency signals produced by oscillators 312 and 313 are compared by frequency comparator 314. Frequency controller 309 is responsive to the comparison performed by comparator 314 to adjust the frequency of numerically controlled oscillator 312. Numerically controlled oscillators of this type are well known in the art and examples of such oscillators are set forth in U.S. Pat. No. 4,933,890 which is hereby incorporated by reference. When frequency controller 309 has adjusted the output of numerically controlled oscillator 312 to be equal to that of precision oscillator 313 within a predefined range, frequency controller 309 transmits the resulting number to node processor 308. Node processor 308 utilizing a user-info message to transmit this number via interconnecting link interfaces to the base stations 321 through 331. One skilled in the art could also readily see that logical links could be individually set up on D channels of the telecommunication links interconnecting the base stations and node processor 308. Each of these logical channels then could be utilized to transmit the derived number to each base station. For example, node processor 308 transmits the number to an application running in station controller 328 via PRI interface 307, PRI link 318, and PRI interface 322. Station controller 328 then transmits this number to numerically controlled oscillator 324 which is identical to numerically controlled oscillator 312. The frequency utilized to drive numerically controlled oscillator 324, is that recovered from PRI link 318 by PRI interface 322 and frequency recovery circuit 323. The resulting frequency generated by numerically controlled oscillator 324 and transmitted to frequency generator 326 is equal to the frequency generated by precision oscillator 313. Frequency generator 326 then utilizes the frequency signal received from oscillator 324 to generate different frequencies required by transmission unit 329 to communicate with wireless handsets. Among these frequencies is the 0.488 Hz signal. Also, station controller 328 controls transmission unit 329 and utilizes transmission unit 329 to communicate with wireless handsets.

Figure 4:
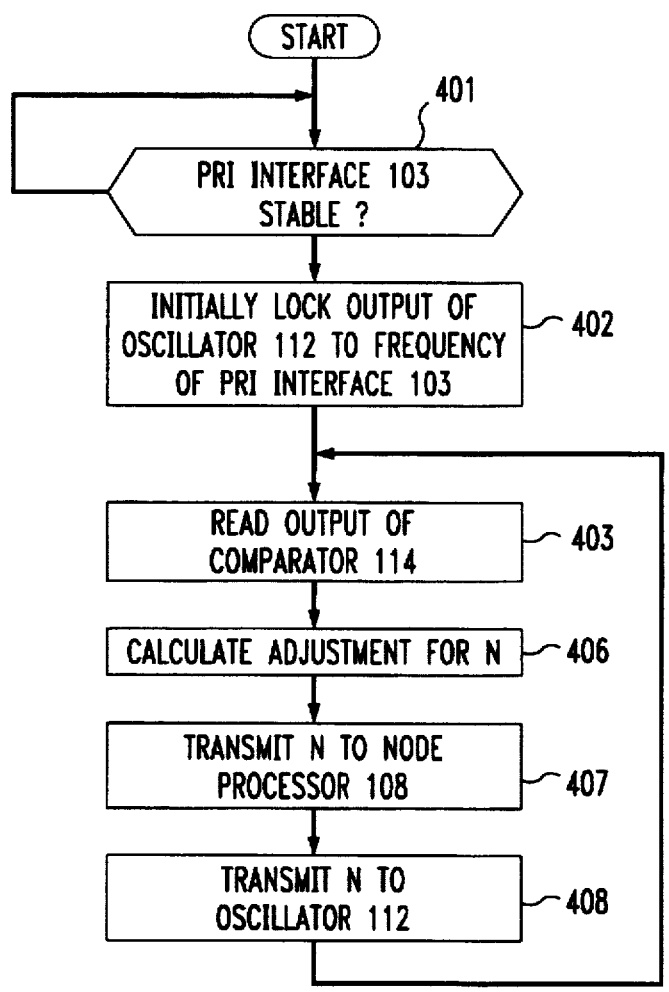
FIG. 4 illustrates, in flow chart form, operations performed by a frequency controller in the second embodiment.

FIG. 4 illustrates, in flow chart form, the steps performed by frequency controller 309. Decision block 401 determines if PRI interface 303 is stable. If PRI interface 303 is stable, node processor 308 transmits a message to that effect to frequency controller 309. Block 402 performs the initial frequency locking of oscillator 312 to the frequency being derived from PRI interface 303. After the initial frequency locking is performed which will occur on initialization, block 403 reads the output of comparator 314. Block 406 calculates "N". Block 407 transmits the calculated "N" to node processor 308 which then retransmits this number to each of the station controllers of FIG. 3. After execution of block 407, block 408 transmits "N" to numerically controlled oscillator 312. After execution of block 408, control is transferred back to block 403.

It is to be understood that the above-described embodiments are merely illustrative of the principles of the invention and that other arrangements may be devised by those skilled in the art without departing from the spirit or scope of the invention.

The invention claimed is:

1. An apparatus for generating a frequency in a system having a controller connected to subunits via communication links, comprising:

a first oscillator for generating a first frequency signal;

a second oscillator for generating a second frequency signal in responsive to the first frequency signal;

means for generating a third frequency signal;

means for calculating a number based on the difference between the first frequency signal and the third frequency signal;

the second oscillator further responsive to the number for generating the second frequency signal so as to minimize the difference;

the controller transmitting the number to one of the subunits via one of the communication links;

means in the one of the subunits for deriving a fourth frequency signal from the communication link where the fourth frequency signal is the transmission frequency of the communication link; and a third oscillator in the one of subunits responsive to the derived fourth frequency signal and the transmitted number to generate a fifth frequency signal that is equal to first frequency signal within a predefined limit.

2. The apparatus of claim 1 wherein means for generating derives the third frequency signal from a transmission frequency signal of an external communication link interconnecting the system to another system.

3. The apparatus of claim 2 wherein the fourth frequency signal is derived from the second frequency signal.

4. The apparatus of claim 3 wherein the second oscillator is a numerically controlled oscillator.

5. An apparatus for generating a frequency in a system having a controller connected to subunits via communication links, comprising:

a first oscillator for generating a first frequency signal;

means for generating a second frequency signal;

a second oscillator for generating a third frequency signal in responsive to the second frequency signal; means for calculating a number based on the difference between the first frequency signal and the second frequency signal;

the second oscillator further responsive to the number for generating the third frequency signal so as to minimize the difference;

the controller transmitting the number to one of the subunits via one of the communication links;

means in the subunit for deriving the fourth frequency signal from the communication link where the fourth frequency signal is the transmission frequency of the communication link; and a third oscillator in the subunit responsive to the derived fourth frequency signal and the transmitted number to generate a fifth frequency signal that is equal to first frequency signal within a predefined limit.

6. The apparatus of claim 5 wherein means for generating derives the second frequency signal from a transmission frequency signal of an external communication link interconnecting the system to another system.

7. The apparatus of claim 6 wherein the second oscillator is a numerically controlled oscillator.

8. An apparatus in one of a plurality of subunits of a system where the one of the plurality of subunits is connected to a central controller of the system via communication links and the apparatus recovers a first frequency in response to a transmitted number from the system that defines the difference between a transmission frequency signal of one of the communication links connecting the one of the plurality of subunits to the system and a first frequency signal in the controller, the apparatus comprising:

a circuit for recovering the transmission frequency signal from the communication link;

an oscillator;

a subunit controller response to the transmission number for communicating control information to the oscillator; and the oscillator responsive to the transmission frequency signal and the control information to generate a second frequency signal that is equal to the first frequency signal within a predefined limit.

9. The apparatus of claim 8 wherein the oscillator is a numerically controlled oscillator.

10. An apparatus for generating a frequency including a switch node which is providing telecommunication service to a plurality of wireless handsets via a plurality of base stations each connected to the switch node via a plurality of internal telecommunication links with the switch node being interconnected to a telecommunication switching system via a plurality of external telecommunication links, comprising:

a first oscillator in the switch node for generating a first frequency signal;

a second oscillator in the switch node responsive to the first frequency signal for generating a second frequency signal;

a telecommunication interface connected to one of the plurality of external telecommunication links and recovering the transmission frequency signal of the one of the plurality of external telecommunication links;

a frequency comparator in the switch node in the switch node responsive to the second frequency signal and transmission frequency signal for determining a difference;

a controller in the switch node responsive to the determined difference for generating a number for controlling the second oscillator to modify the second frequency signal to minimize the determined difference;

the second oscillator further responsive to the number for modifying the second frequency signal;

the controller further transmitting the number to one of the plurality of base stations via one of the plurality of internal telecommunication links;

a circuit in one of the plurality of base stations for recovering another transmission frequency signal from the one of the plurality of internal telecommunication links;

a third oscillator in the one of the plurality of base stations;

a base station controller in the one of the plurality of base stations responsive to the transmitted number for communicating control information to the third oscillator; and the third oscillator responsive to the other transmission frequency signal and the control information to generate a third frequency signal that is equal to the first frequency signal within a predefined limit.

11. The apparatus of claim 10 wherein the other transmission frequency signal is derived from the second frequency signal.

12. The apparatus of claim 11 wherein the controller responsive to loss of the one of the plurality of external telecommunication links to cease generating a number for controlling the second oscillator.

13. The apparatus of claim 12 wherein the second oscillator is a numerically controlled oscillator.

14. An apparatus for generating a frequency including a switch node which is providing telecommunication service to a plurality of wireless handsets via a plurality of base stations each connected to the switch node via a plurality of internal telecommunication links with the switch node being interconnected to a telecommunication switching system via a plurality of external telecommunication links, comprising:

a first oscillator in the switch node for generating a first frequency signal;

a telecommunication interface connected to one of the plurality of external telecommunication links and recovering the transmission frequency signal of the one of the plurality of external telecommunication links;

a second oscillator in the switch node responsive to the transmission frequency signal for generating a second frequency signal;

a frequency comparator in the switch node in the switch node responsive to the second frequency signal and transmission frequency signal for determining a difference;

a controller in the switch node responsive to the determined difference for generating a number for controlling the second oscillator to modify the second frequency signal to minimize the determined difference;

the second oscillator further responsive to the number for modifying the second frequency signal;

the controller further transmitting the number to one of the plurality of base stations via one of the plurality of internal telecommunication links;

a circuit in one of the plurality of base stations for recovering another transmission frequency signal from the one of the plurality of internal telecommunication links;

a third oscillator in the one of the plurality of base stations;

a base station controller in the one of the plurality of base stations responsive to the transmitted number for communicating control information to the third oscillator; and the third oscillator responsive to the other transmission frequency signal and the control information t o generate a third frequency signal that is equal to the first frequency signal within a predefined limit.

15. The apparatus of claim 14 wherein the other transmission frequency signal is derived from the transmission frequency signal.

16. The apparatus of claim 15 wherein the second oscillator is a numerically controlled oscillator.

17. An apparatus in a base station is interconnected to a switch node via a telecommunication link and the base station is providing telecommunication service to a plurality of wireless handsets for recovering a first frequency in response to a transmitted number from the switch node that defines the difference between a transmission frequency signal of the telecommunication link and a first frequency signal in the switch node, comprising:

a circuit for recovering the transmission frequency signal from the telecommunication link;

an oscillator;

a base station controller responsive to the transmitted number for communicating control information to the oscillator; and the oscillator responsive to the transmission frequency signal and the control information to generate a second frequency signal that is equal to the first frequency signal within a predefined limit.

18. The apparatus of claim 17 wherein the oscillator is a numerically controlled oscillator.

19. An apparatus for generating a frequency in a switch node which is providing telecommunication service to a plurality of wireless handsets via a plurality of base stations each connected to the switch node via a plurality of internal telecommunication links with the switch node being interconnected to a telecommunication switching system via a plurality of external telecommunication links, comprising:

a first oscillator in the switch node for generating a first frequency signal;

a second oscillator in the switch node responsive to the first frequency signal for generating a second frequency signal;

a telecommunication interface connected to one of the plurality of external telecommunication links and recovering the transmission frequency signal of the one of the plurality of external telecommunication links;

a frequency comparator in the switch node in the switch node responsive to the second frequency signal and transmission frequency signal for determining a difference;

a controller in the switch node responsive to the determined difference for generating a number for controlling the second oscillator to modify the second frequency signal to minimize the determined difference;

the second oscillator further responsive to the number for modifying the second frequency signal; and the controller further transmitting the number to the plurality of base stations via the plurality of internal telecommunication links whereby the each of the plurality of base stations recovers the first frequency signal using the transmitted number and transmission frequency signal of each of the plurality of internal telecommunication links.

20. The apparatus of claim 19 wherein the controller responsive to loss of the one of the plurality of external telecommunication links to cease generating a number for controlling the second oscillator.

21. The apparatus of claim 20 wherein the second oscillator is a numerically controlled oscillator.

* * * * *